(12) United States Patent
Balakrishnan et al.

(10) Patent No.: US 8,572,325 B2
(45) Date of Patent: Oct. 29, 2013

(54) DYNAMIC ADJUSTMENT OF READ/WRITE RATIO OF A DISK CACHE

(75) Inventors: Ganesh Balakrishnan, Apex, NC (US); Gordon B. Bell, Madison, WI (US); Timothy H. Heil, Rochester, MN (US); MVV Anil Krishna, Cary, NC (US); Brian M. Rogers, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/961,798

(22) Filed: Dec. 7, 2010

(65) Prior Publication Data

US 2012/0144109 A1    Jun. 7, 2012

(51) Int. Cl.
*G06F 12/08* (2006.01)
(52) U.S. Cl.
USPC .......................................... 711/129; 711/113
(58) Field of Classification Search
None
See application file for complete search history.

(56) References Cited

U.S. PATENT DOCUMENTS

| | | | |
|---|---|---|---|
| 5,247,653 A * | 9/1993 | Hung | 703/13 |
| 6,865,647 B2 * | 3/2005 | Olarig et al. | 711/129 |
| 6,941,419 B2 | 9/2005 | Haines et al. | |
| 7,058,764 B2 | 6/2006 | Bearden | |
| 7,428,625 B2 | 9/2008 | Song | |
| 7,739,454 B2 * | 6/2010 | Hoshino et al. | 711/129 |

\* cited by examiner

*Primary Examiner* — Gary Portka
(74) *Attorney, Agent, or Firm* — Daniel H. Schnurmann; Jeffrey L. Streets (57) ABSTRACT

Embodiments of the invention are directed to optimizing the performance of a split disk cache. In one embodiment, a disk cache includes a primary region having a read portion and write portion and one or more smaller, sample regions also including a read portion and a write portion. The primary region and one or more sample region each have an independently adjustable ratio of a read portion to a write portion. Cached reads are distributed among the read portions of the primary and sample region, while cached writes are distributed among the write portions of the primary and sample region. The performance of the primary region and the performance of the sample region are tracked, such as by obtaining a hit rate for each region during a predefined interval. The read/write ratio of the primary region is then selectively adjusted according to the performance of the one or more sample regions.

20 Claims, 5 Drawing Sheets

DYNAMIC ADJUSTMENT OF READ/WRITE RATIO OF A DISK CACHE

BACKGROUND

1. Field of the Invention

The present invention relates to computer memory systems, and in particular to optimizing the performance of a disk cache.

2. Background of the Related Art

A cache is a computer system component on which data can be stored on behalf of a storage device, and from which data may be accessed faster than from the storage device. Cache generally has much less capacity than the corresponding storage device, and is therefore used to store data that is likely to be requested again, such as the more relevant or more recent data. Several different layers of cache are provided in a modern computer system. Level 1 (or primary) cache, for example, is used to store data on behalf of system memory (which comprises random access memory, i.e. RAM) for access by a processor. Level 1 cache can be built directly into the processor and can run at the same speed as the processor, providing the fastest possible access time. Level 2 (or secondary) cache is also used to store a portion of system memory and may be included within a chip package, but is separate from the processor. Level 2 cache has greater capacity than Level 1 cache, but is slower. A disk cache is used to store reads and writes from the hard disk drive (HDD). In many systems, the disk cache is the most important type of cache in terms of its effect on system performance because of the especially large differential in speed between system memory and the HDD. Disk cache may be used a variety of mediums, such as Flash, DRAM, eDRAM, or SRAM.

Memory transfers between the HDD and the disk cache are typically handled in pages. A page is the smallest unit of data for transfer between the disk cache (residing in main memory) and the HDD, where the pages are arranged within the disk cache in blocks. For example, a 128 kilobyte (KB) block may have a total of sixty-four 2 KB pages. Every new write causes a new page to be written to the disk cache, which invalidates any previous page with the same corresponding address range that may have already been in the disk cache. Writes can render a large portion of a disk cache unusable due to the accumulation of invalid pages, particularly in a unified cache in which reads and writes are not segregated. An invalid page can be recovered for use only after the entire block containing the page is "erased." The "erase" operation affects the access latency of the hard disk, and therefore is only done when the fraction of free writable pages is small (typically, when the free writable pages comprise less than 20% of all pages). Meanwhile, a large fraction of the pages may be invalid. This can adversely affect the disk cache's hit rate since the disk cache may be effectively much smaller than its rated size.

In contrast to a unified cache, some caches are split into separate read and write portions, wherein data associated with writes is cached to the write portion and data associated with reads is cached to the read portion. Split disk caches are often preferred when using NAND Flash cells. In a split disk cache, the write portion experiences most of the invalidated pages within the cache, which triggers more frequent block erasures within the write portion, while keeping the read portion relatively immune to the page invalidation problem. The read portion remains largely undiminished, and the cache achieves better hit rates overall. While the write latency may increase due to the more frequent block erasures, write latency is generally less critical to application behavior than read latency.

BRIEF SUMMARY

One embodiment of the present invention provides a method. The method includes selecting a primary region of a cache including a read portion and write portion and selecting a sample region of the cache also including a read portion and a write portion. The read/write ratio of the sample region is different than a read/write ratio of the primary region. Reads from and writes to a hard disk are cached such that each cached read is stored in the read portion of the sample region or primary region and each cached write is stored in the write portion of the sample region or primary region. The performance of the primary region and the performance of the sample region are each tracked during a predefined interval, such as by determining a hit rate for the each of the primary region and one or more sample region. The performance of the primary region is compared to the performance of the sample region, and the read/write ratio of the primary region is adjusted according to the comparison. The method may be implemented using a computer program product including computer usable program code embodied on a computer usable storage medium.

Another embodiment of the invention provides a cache system, in which a cache has a primary region including a read portion and write portion and one or more sample region each including a read portion and a write portion. Counters are provided for tracking hits in the primary region and hits in the sample region during a predefined interval. A comparator is provided for comparing a hit rate in the primary region to a hit rate in the sample region. A cache controller includes control logic for caching reads and writes from a hard disk such that each cached read is located at the read portion of the sample region or primary region and each cached write is at the write portion of the sample region or primary region. Control logic is also included for adjusting the read/write ratio of the primary region according to the comparison performed by the comparator.

DETAILED DESCRIPTION

Embodiments of the invention include a system and method for adaptively sizing read and write portions of a disk cache based on application behavior. The data store of the disk cache may be divided into at least two regions, including a primary region and one or more sample region. The primary region is typically much larger than the one or more sample regions, such as between 90 to 99% of the total cache capacity of the data store. The primary region and sample region are each split into separate read and write portions. Writes are cached to the write portions and reads are cached to the read portions. Cached reads and writes are typically randomly distributed in the disk cache 20, particular over longer periods and in applications having a relatively large footprint. Assuming the cached reads and writes are randomly distributed. in the disk cache 20, the number of cached reads and writes in the read and write portions are typically in proportion to size, such that the primary region receives a proportionally greater number of cached reads and writes than the one or more sample regions. The size-ratio of the read portion to write portion (i.e. the read/write ratio or R/W ratio) in the primary region and each sample region may be independently selected and dynamically adjusted. The sample region is used to evaluate one or more alternative R/W ratios to determine if a better R/W ratio is available for the primary region. The R/W ratio of the primary region may be dynamically adjusted according to the observed performance of the sample region.

A sample region is used to evaluate the performance of a R/W ratio that is different that the R/W ratio of the primary region. The size of the one or more sample regions is large enough to evaluate an alternative R/W ratio, but small enough not to greatly affect the overall performance of the cache. A performance metric, such as a hit rate, is evaluated in each sample region. The R/W ratio of the primary region is then selected according to a comparison between the hit rate in the primary region and the hit rate in the one or more sample region. For example, if a better hit rate is observed in one of the sample regions than in the primary region, then the R/W ratio of the primary region may be adjusted to (or at least adjusted toward) the current R/W ratio of that sample region. The evaluation may be performed iteratively, such as during successive intervals in which an alternative R/W ratio is implemented in the one or more sample region that is different than the R/W ratio of the primary region. Thus, the R/W ratio of the primary region is dynamically adjusted to achieve a better performance than a static R/W ratio would otherwise achieve, and to periodically change the R/W ratio of the primary region according to application behavior.

Figure 1:
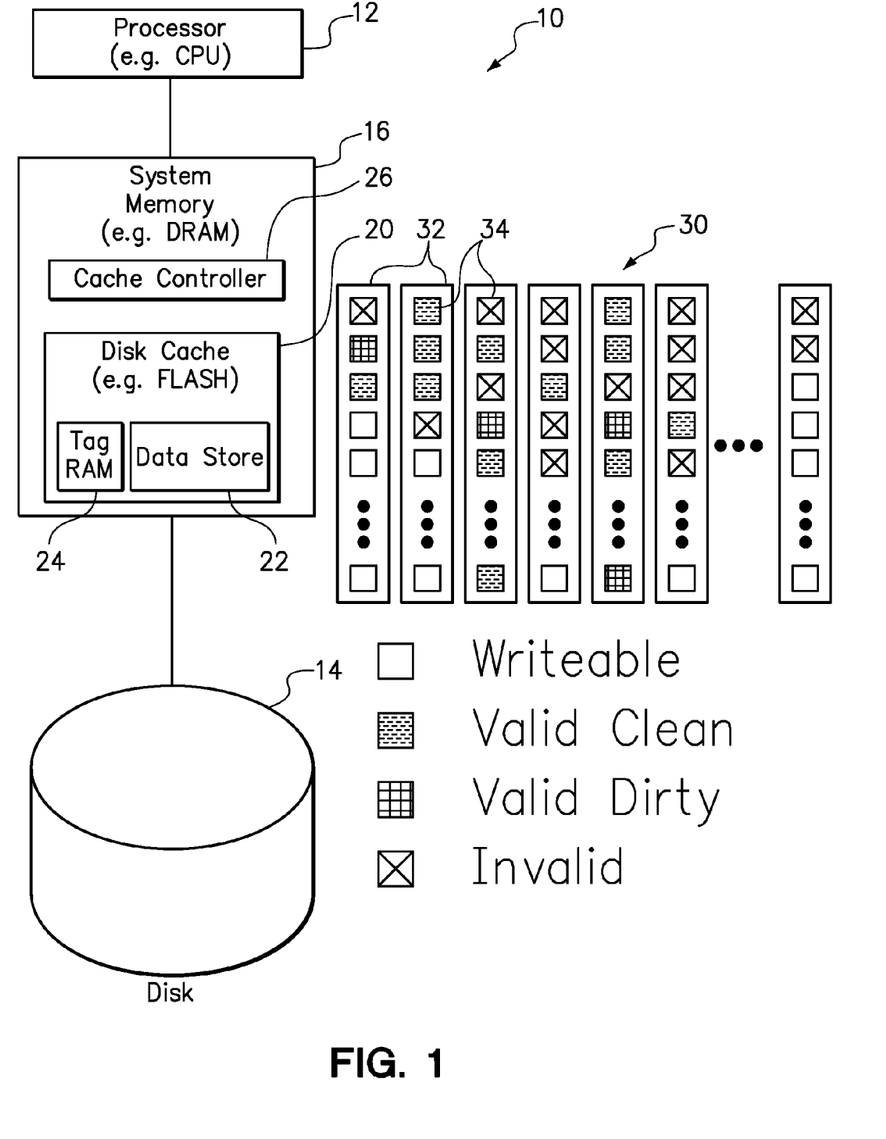
FIG. 1 is a schematic diagram of a computer system on which an optimized caching system and method may be implemented according to an embodiment of the invention.

FIG. 1 is a schematic diagram of a computer system 10 on which a caching system and method may be implemented according to an embodiment of the invention. The computer system 10 includes a processor 12, a hard disk drive (HDD) 14, and system memory 16. The HDD 14 comprises non-volatile memory providing long-term storage for software, such as an operating system (OS), software applications, and data files. System memory 16 typically comprises volatile memory, which may include DRAM (dual random access memory) based memory modules for loading selected software instructions for execution from the HDD 14. The processor 12 may be a central processing unit (CPU) for executing the selected software instructions, such as to processes data. System memory 16 is smaller than the HDD 14 in terms of storage size, but provides faster access (read/write) rates than the HDD 14. The comparatively large, non-volatile memory provided by the HDD 14 is therefore well suited for storing software and data over longer periods of time, even when the computer system 10 is powered off. The comparatively faster system memory 16 is well suited for loading the software instructions selected for execution by the processor 12 when the computer system 10 is powered on.

A disk cache 20 is provided between the processor 12 and the HDD 14. The disk cache 20 may be a portion of system memory 16 devoted specifically for caching selected data from the HDD 14 that is likely to be accessed repeatedly. The disk cache 20 is used to store data that is likely to be needed during execution of the currently selected software instructions, such as pre-fetched data, or data that is more relevant to the currently selected software instructions. A cache controller 26 is provided for controlling the disk cache 20. The disk cache 20 may include a data store 22 and a tag RAM 24. The data store 22 is the portion of the disk cache 20 in which the cached data is actually kept, whereas the tag RAM 24 is a smaller area of the disk cache 20 that is used to keep track of where in memory the entries in the data store 22 belong. The size of the cache generally refers to the size of the data store 22, and the primary and sample regions discussed below reside in the data store 22.

An example structure in which data is written to the data cache 20 is schematically shown in FIG. 1. The cache is organized in blocks 32 each having a fixed block size. Each block 32 includes a plurality of pages 34 each having a fixed page size. For example, the size of each block 32 may be 128 KB, containing a total of 64 2 KB pages 34. The page size is the minimum unit of data for transfer between the disk cache 20 and the HDD 14. Each cached page 34 is associated with a particular address range on the HDD 14. The tag RAM 24 is used to record the particular address location on the HDD 14 of the cached pages 34. When reading or writing data of a selected address range, the disk cache 20 is first consulted to see if the associated page 34 of data is already present in the disk cache 14, which is faster to access than the HDD 14. For example, for a read request, if a valid page is already present in the disk cache 14, then the requested page may be read directly from the disk cache 26 without accessing the HDD 14. In response to a write request, the page may be immediately written to the disk cache 14, for subsequent transfer to the HDD 14. If the page was already present in the disk cache 14, the newly written page becomes the valid page and the previous version of that page is marked invalid. The invalid page may remain in the disk cache 20 indefinitely until the cache controller 26 determines that the invalid page needs to be deleted to make room for a new page.

Each page 34 may have any one of four different states, as indicated symbolically. A "writeable" page is available space for caching a selected page from the HDD 14. A "valid clean page" is a page in the cache having data that is current with the corresponding page on the HDD 14. A valid clean page may result, for example, from a read miss, wherein a page requested to be read was not already cached, and which was subsequently written to the cache in response to the read request. A "valid dirty page" is a cached page that is more current than its corresponding page on the HDD 14. A valid dirty page may result, for example, in response to a write hit, wherein a page requested to be written was already cached and an updated version of the same page (the valid dirty page) was written directly to another location in the cache. The previously cached version of that page then becomes an "invalid" page. A dirty valid page may be marked by a so-called dirty bit, which instructs the system to write the dirty page back to the HDD before replacing the page with a different page having a different address range. The presence of invalid pages decreases the effective cache size. Typically, a certain number of invalid pages must be present within a block 34 before the pages in the block are returned to writeable state for accepting new pages. The latency is directly related to how often the blocks 32 are erased.

As applied to the embodiments below, the term "block" represents the granularity at which a chunk of the disk cache 20 may be marked as being part of the read or write portion.

This is analogous to a 64 page block in a flash based disk cache, or a page in a DRAM cache. In order to find an optimal ratio of blocks to apportion to read and write portions, the disk cache 20 is split into two main regions—one larger, "primary" region and one smaller, "sample" region. The primary region is made up of about 90 to 99% of the blocks in the Flash storage and the smaller region comprises the rest of the blocks. As an example, a 1 GB disk cache, with 128 KB-sized blocks, has 8192 blocks. These can be divided into a larger region with 7168 blocks and a smaller region with 1024 blocks. As discussed further below, the smaller region may be subdivided into more than one region in order to evaluate several competing R/W ratios.

Figure 2:
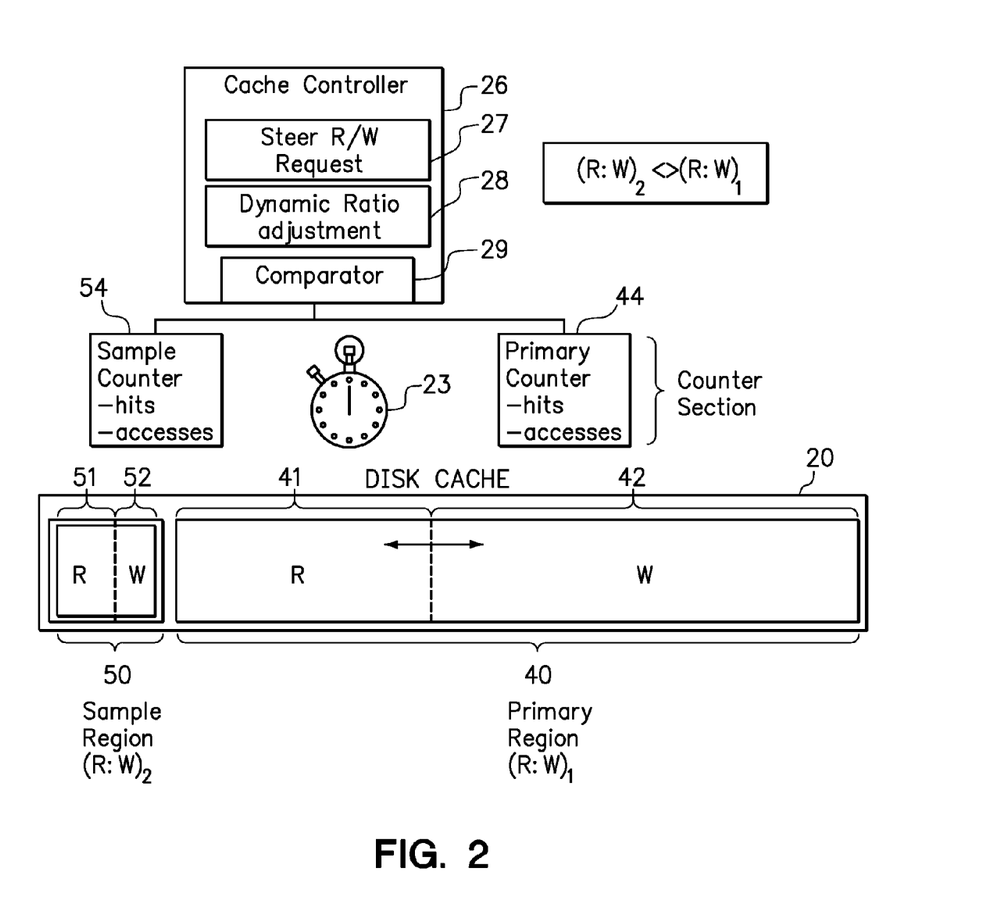
FIG. 2 is a schematic diagram of a caching system according to an embodiment of the invention for optimizing the performance of the disk cache.

FIG. 2 is a schematic diagram of a caching system according to an embodiment of the invention for optimizing the performance of the disk cache 20. The disk cache 20 is divided into a primary region 40 and a sample region 50. The primary region 40 is split into a read portion 41 and a write portion 42. The sample region is also split into a read portion 51 and a write portion 52. The entire cache 20 is used to cache data in pages, such that some pages cached in response to a read request (i.e. cached reads) are placed in the read portion 41 of the primary region 40 and the remainder of the cached reads are placed in the read portion 51 of the sample region 50. Likewise, some pages cached in response to a write request (i.e. cached writes) are placed in the write portion 42 of the primary region 40 while the remaining cached writes are placed in the write portion 52 of the sample region 50. For example, the read portion 41 and write portion 42 of the primary region 40 are typically larger than the respective read portion 51 and write portion 52 of the sample region 50.

The vertical dotted line in each region 40, 50 represents the logical boundary between the respective read and write portions in that region. Physically, the blocks need not be partitioned as shown, and may reside anywhere in the disk cache 20, using metadata bits to indicate if the block is part of the read portion or write portion. Each dotted line marks the proportion of the write portion to read portion of the respective region at a particular moment.

The cache controller 26 includes control logic 27 for steering reads and writes to the cache 20. The cached reads and writes may be apportioned among the sample region and primary region in proportion to their size. When there is a need to write a new page, such as in response to a read miss, a write hit or a write miss, the control logic 27 may select a candidate region of the disk cache 20 with a probability based on the relative sizes of each region. Assuming a random distribution, this proportional distribution of pages may result according to a size-based probability distribution, in that the read portion 41 or write portion 42 of the primary region may naturally receive proportionally greater number of pages than the smaller read portion 51 and write portion 52 of the sample region 50. In another implementation, the control logic 27 may force this proportional distribution of requests, such as in a NAND Flash based storage medium, in which each new page of data may be mapped anywhere in the cache 20. Because a hit rate may be defined as the number of hits per the total number of accesses, a proportional distribution of reads and writes is not required. However, the proportional distribution is desirable to have or enforce as an optional feature, such as to achieve a comparable level of precision in the hit rate determined for each of the primary region and one or more sample region. In another embodiment, the hit rate may be evaluated as the number of hits in a given interval, in which case it is more desirable to achieve a random distribution of cached reads and writes.

The smaller, sample region 50 is used to evaluate the performance of a different R/W ratio than the larger, primary region 40. This condition $(R:W)_2 < > (R:W)_1$ indicated in the figure signifies that a different R/W ratio is selected in the sample region 50 than in the primary region 40. The performance of an R/W ratio is typically measured by a hit rate in the sample region 50. The hit rate refers to the percentage of accesses that result in cache hits. The primary region 40 implements an R/W ratio selected according to the performance of the sample region 50. Thus, the sample region 50 is used to dynamically search for a more optimal R/W ratio, which may change over time, such as due to changes in application behavior or the selection of different applications over time. For example, an application which has very few writes may achieve better performance using a large read portion and a tiny write portion. An application with a lot of writes, on the other hand, may perform poorly if most of the disk cache is designated as a read portion.

The sample region 50 is small enough that if the performance of the sample region 50 is poorer than in the primary region 40 during a given interval, that the sample region 50 will not significantly reduce the overall performance. However, if the performance observed in the sample region 50 is significantly better than the performance observed in the primary region 40 during a given interval, then the R/W ratio of the primary region 40 may be adjusted. For example, the R/W ratio of the primary region 40 may be changed to the R/W ratio that was recently evaluated in the sample region 50. More conservatively, the R/W ratio of the primary region 40 may instead be adjusted toward (but not all the way to) the R/W ratio that was recently evaluated in the sample region 50. Thus, if the performance observed in the sample region 50 is consistently better than the performance observed in the primary region 40 during a succession of intervals, then the R/W ratio may be adjusted closer to the R/W ratio of the sample region 50 upon conclusion of each successive interval. If the R/W ratio already in effect in the primary region 40 results in better performance than the sample region 50 upon conclusion of one interval, then the same R/W ratio may continue to be applied in the primary region 40 in the next interval.

The performance of a selected R/W ratio may be evaluated, at least in part, according to a hit rate. Counters are provided to maintain the hit rates separately for each region. Still referring to the embodiment of FIG. 2, the counters include a primary counter 44 for counting hits and accesses in the primary region 40 and a sample counter 54 for counting hits and accesses in the sample region 50 during a given interval. The hit rate may be determined as the percentage of accesses that result in cache hits. The interval may be measured, for example, in seconds, clock ticks, or number of requests. An interval counter 23 is provided to time the interval, such as to keep track of the elapsed time, clock ticks, or number of requests. Upon conclusion of a given interval, a comparator control logic 29 compares the primary counter 44 to the sample counter 54 to determine whether the R/W ratio currently implemented in the primary region 40 or the R/W ratio currently implemented in the sample region 50 produced better performance, as determined by the hit rate. If the R/W ratio currently implemented in the primary region 40 produced better or at least equivalent performance, then that R/W ratio is maintained for the next interval. If the R/W ratio currently implemented in the sample region 50 produced better performance, then the R/W ratio of the primary region 40 is adjusted accordingly. Control logic 28 is provided for dynamically performing this adjustment. Upon the conclusion of each interval, the counters 44 and 54 are reset in order to measure the hit rates during the next interval.

As an example, the defined interval may be set equal to 100 million memory cycles. During these 100 million cycles, counters measure the hit rate for the primary region and each of the one or more sample regions. Implementing a selected R/W ratio of each of the primary region and sample region involves marking some blocks as belonging to read portions, and marking other blocks as belonging to write portions. Adjusting the R/W ratio then entails marking some blocks which previously belonged to the read portion region in one interval to belong to the write portion region in another interval, or vice versa. Over time, the write portion of a primary region or test region will start accumulating page writes and the read portion will stop accumulating page writes. The read portion may inherit some dirty pages from the write region when the block is reassigned to be part of the read portion. This does not, however, require a modification to the read portion's behavior.

Selecting which blocks to move from the read portion to the write portion or vice versa is another decision that may be considered when a change to the R/W ratio is to be performed. Some heuristics may be used in making this selection. Using NAND Flash based disk cache, for example, when considering relocating a block from the write portion to a read portion it may be preferable to prioritize blocks that have the minimum number of invalid pages. This way, the read portion is not inundated with blocks which reduce the effective read portion size and therefore the hit rate. Similar considerations apply when moving a block form the read portion to the write portion.

Figure 3:
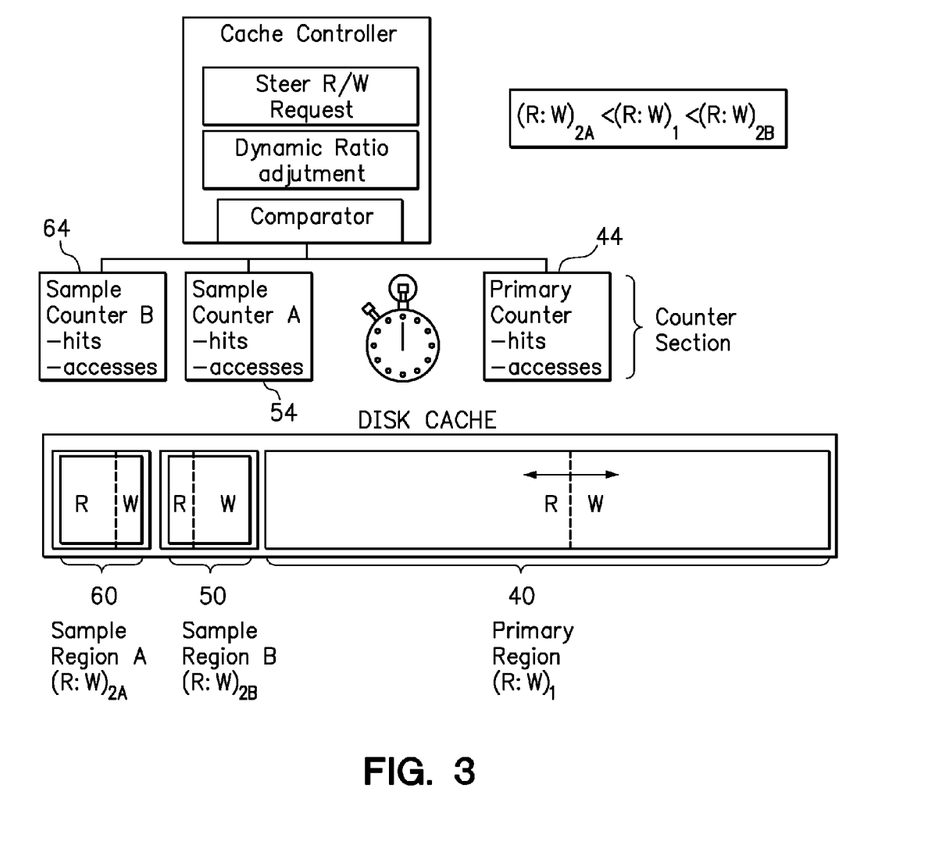
FIG. 3 is a schematic diagram of the caching system for simultaneously evaluating two different read/write ratios in addition to the read/write ratio currently implemented in the primary region.

FIG. 3 is a schematic diagram of the caching system for simultaneously evaluating two different R/W ratios in addition to the R/W ratio currently implemented in the primary region 40. This embodiment employs a second sample region 60 and counter 64. The two sample regions 50 and 60 are alternately referred to as Sample Regions A and B, as indicated in the figure. A first sample R/W ratio is implemented in the first sample region 50. A second sample R/W ratio is implemented in the second sample region 60. The first sample counter 54 counts the number of hits in the first sample region 50 and a second sample counter 64 counts the number of hits in the second sample region 60. The hit rate in each of the two sample regions 50, 60 are compared to the hit rate in the primary region 40 during a given interval. As in the FIG. 2 embodiment, the hit rate in the primary region 40 may be compared to the sample R/W ratios, except that the use of two sample R/W ratios provides more information for determining adjustments to the R/W ratio of the primary region 40. For example, the condition $(R:W)_{2A} < (R:W)_1 < (R:W)_{2B}$ in the figure signifies that the first sample R/W ratio is less than the R/W ratio currently implemented in the primary region 40 and the second sample R/W ratio is greater than the R/W ratio currently implemented in the primary region 40.

Figure 4:
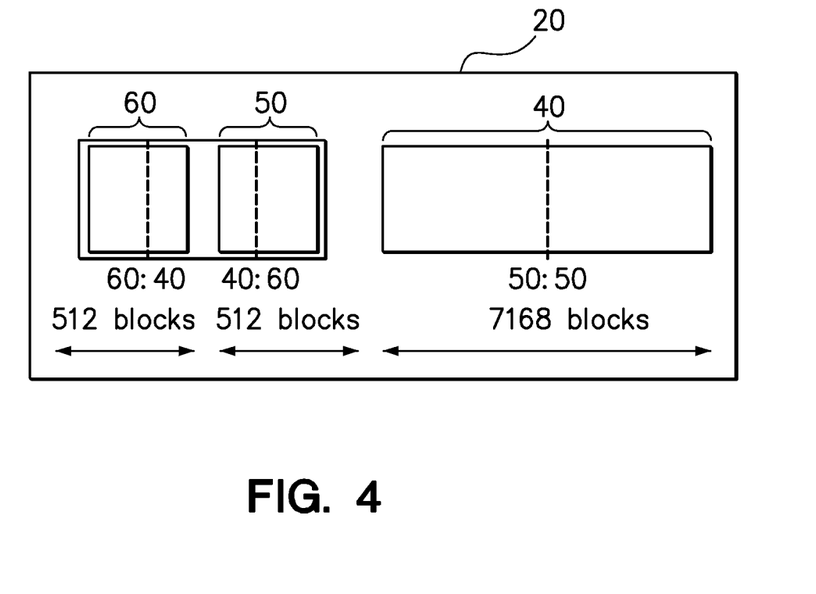
FIG. 4 is a schematic diagram of the disk cache with selected values for the R/W ratios.

FIG. 4 is a schematic diagram of the disk cache 20 with selected values for the R/W ratios. The first and second sample regions 50, 60 are each 512 blocks in size, and are used to evaluate different competing R/W ratios. The primary region 40 is much larger, having 7168 blocks, so that the R/W ratio of the primary region will have a greater overall effect on disk cache performance. During a given interval, the first sample region 50 employs a ratio of 40:60 while the second sample region 60 simultaneously employs a second ratio of 60:40. The performance of the primary region 40 may be compared to the performance in each of the first and second sample regions 50, 60. For example, upon conclusion of the present interval, if the hit rate achieved in the first sample region 50 (R/W ratio of 40:60) is better than the hit rate in the primary region (R/W ratio of 50:50) and the hit rate in the second sample region 60 (R/W ratio of 60:40) is worse than the hit rate in the second sample region 60 then the R/W ratio of the primary region 40 may be adjusted downward, to (or at least toward) a 40:60 R/W ratio.

All read and write requests lookup all regions for a potential page hit. If it is discovered that a new page needs to be written, the page write is directed to one of the 3 regions with a probability proportional to the region's size. For example, in FIG. 4, 6.25% (512 blocks/8192 blocks in the disk cache=6.25%) of the page writes are sent to the first sample region 50, 6.25% of the page writes are sent to the second sample region 60, and the remaining pages writes are sent to the primary region 40. This ensures that every region gets the same number of page writes per page, on average. The steering logic 27 (see FIG. 2) may or may not be necessary. The steering logic may be used, however, to ensure that the sample regions are able to sample requests in proportion to their sizes. This allows them to evaluate the competing R/W ratios objectively.

Figure 5:
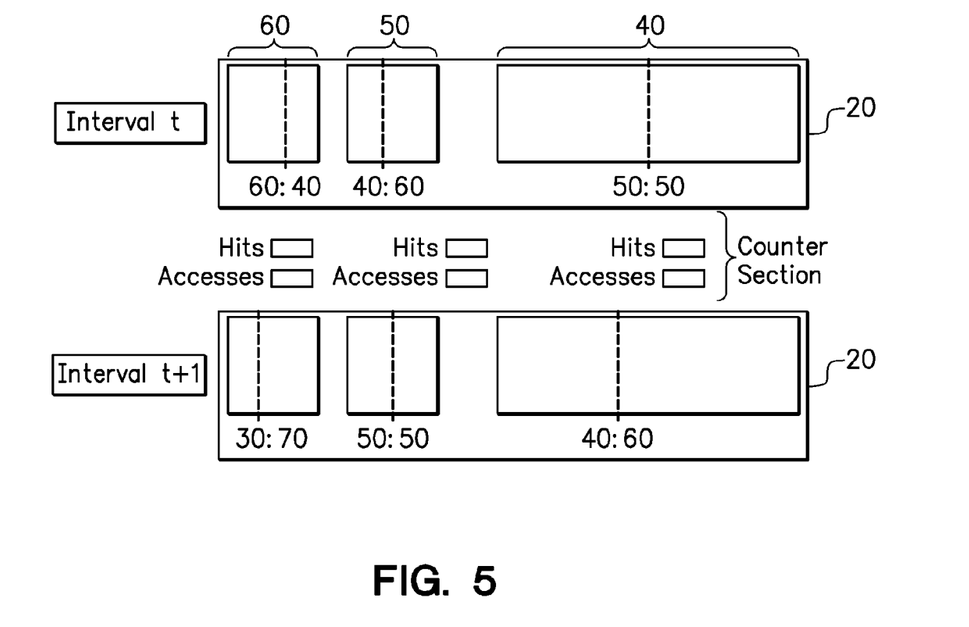
FIG. 5 is a schematic diagram of the disk cache illustrating an example of an adjustment to the read/write ratios in successive intervals t and t+1.

FIG. 5 is a schematic diagram of the disk cache 20 illustrating an adjustment to the R/W ratios in successive intervals t and t+1. The R/W ratios during interval t are the same as in FIG. 4. For interval t+1, the R/W ratios in the primary region is adjusted to 40:60, which had a better hit rate during interval t in this example. The sample R/W ratios are adjusted to 50:50 in the first sample region 50 and 30:70 in the second sample region 60. The granularity of the adjustments may be different depending on the application's phase change behavior. An application that changes phase suddenly may employ a larger granularity (for the same example, 70:30 and 30:70 in sample regions 1 and 2 respectively). An application that changes phase more gradually may apply a finer granularity (for the same example, 55:45 vs. 45:55 in sample regions 1 and 2 respectively). The granularity of the adjustment in the R/W ratio implemented in the primary region 40 may also depend on the magnitude of the difference in effectiveness of the competing R/W ratios.

The technique of dividing up the disk cache into multiple regions and using direct algorithm competition in one or more smaller sample regions to decide a "winning" R/W ratio to be implemented in the larger, primary region may be applied to other optimizations, and not necessarily to the read portion to write portion optimization described. For example, the same approach may be used to identify a better replacement policy for selecting which blocks to erase. The technique of optimizing the read to write portion size ratio, generally, may be applied to other runtime optimizations in a disk cache. For example, this same technique may be applied to identify the optimal block erasure policy, page replacement policy, garbage collection policy etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   selecting a primary region of a cache that is split into a read portion and a write portion;

selecting a sample region of the cache that is split into a read portion and a write portion, wherein a read/write area ratio of the sample region is different than a read/write area ratio of the primary region;

caching reads and writes from a hard disk such that each cached read is stored in the read portion of the sample region or primary region and each cached write is stored in the write portion of the sample region or primary region;

tracking the performance of the primary region and the performance of the sample region during a predefined interval; and comparing the performance of the primary region to the performance of the sample region and adjusting the read/write ratio of the primary region according to the comparison.

2. The method of claim 1, wherein the step of tracking the performance of the primary region and the performance of the sample region comprises tracking a hit rate in the primary region and a hit rate in the sample region, and the step of comparing the performance in the primary region to the performance in the sample region comprises comparing the hit rate in the primary region to the hit rate in the sample region.

3. The method of claim 1, further comprising:
dividing the sample region into first and second sample regions, each having a read portion and a write portion;
independently setting the first sample region to a first read/write area ratio that is less than the read/write area ratio of the primary region, and setting the second sample region to a second read/write area ratio that is greater than the read/write area ratio of the primary region; and
comparing a hit rate in the primary region to a hit rate in each of the first and second sample regions and adjusting the read/write area ratio of the primary region toward the read/write area ratio of the sample region having the better hit rate.

4. The method of claim 3, further comprising:
in response to each adjusting of the read/write area ratio of the primary region, adjusting the read/write area ratio of one or both of the sample regions such that the read/write area ratio of the first sample region remains less than the read/write area ratio of the primary region and the read/write area ratio of the second sample region remains greater than the read/write ratio of the primary region.

5. The method of claim 1, further comprising:
controllably directing read and write requests to the sample region and primary region of the cache in proportion to the sizes of the sample region and primary region.

6. The method of claim 1, wherein the predefined interval is a defined time period, a predefined number of cycles, or a predefined number of requests.

7. The method of claim 1, further comprising:
organizing the cache as a plurality of blocks; and
assigning each block to one of the sample region or primary region of the cache.

8. The method of claim 7, further comprising applying metadata to designate each block as belonging to the sample region or primary region of the cache.

9. The method of claim 1, wherein adjusting the read/write area ratio of the primary region comprises marking some blocks which previously belonged to the read portion of the primary region in one interval to belong to the write portion of the primary region in another time interval, or marking some blocks which previously belonged to the write portion of the primary region in one interval to belong to the read portion of the primary region in another time interval.

10. The method of claim 9, further comprising:
prioritizing blocks that have the minimum number of invalid pages when adjusting the read/write ratio of the primary region.

11. A computer program product including computer usable program code embodied on a non-transitory computer readable storage medium, the computer program product comprising:
computer usable program code for writing to a primary region of a cache that is split into a read portion and write portion and for writing to a sample region of the cache that is split into a read portion and a write portion, wherein a read/write area ratio of the sample region is different than a read/write area ratio of the primary region;
computer usable program code for caching reads and writes from a hard disk such that each cached read is located at the read portion of the sample region or primary region and each cached write is at the write portion of the sample region or primary region;
computer usable program code for tracking the performance of the primary region and the performance of the sample region during a predefined interval; and
computer usable program code for comparing the performance in the primary region to the performance in the sample region and adjusting the read/write area ratio of the primary region according to the comparison.

12. The computer program product of claim 11, wherein the computer usable program code for tracking the performance of the primary region and the performance of the sample region comprises tracking the hit rate in each of the primary region and sample region, and the computer usable program code for comparing the performance in the primary region to the performance in the sample region comprises computer usable program code for comparing the hit rate in the primary region to the hit rate in the sample region.

13. The computer program product of claim 11, further comprising:
computer usable program code for dividing the sample region into first and second sample regions, each having a read portion and a write portion;
computer usable program code for independently setting the first sample region to a first read/write area ratio that is less than the read/write area ratio of the primary region, and setting the second sample region to a second read/write area ratio that is greater than the read/write area ratio of the primary region; and
computer usable program code for comparing a hit rate in the primary region to a hit rate in each of the first and second sample regions and adjusting the read/write area ratio of the primary region toward the read/write area ratio of the sample region having the better hit rate.

14. The computer program product of claim 11, further comprising:
computer usable program code for controllably directing read and write requests to the sample region and primary region of the cache in proportion to the sizes of the sample region and primary region.

15. The computer program product of claim 11, further comprising:
computer usable program code for organizing the cache as a plurality of blocks; and
computer usable program code for assigning each block to one of the sample region or primary region of the cache.

16. The computer program product of claim 11, wherein the computer usable program code for adjusting the read/write area ratio of the primary region comprises computer usable program code for marking some blocks which previously belonged to the read portion of the primary region in one interval to belong to the write portion of the primary region in another time interval, or marking some blocks which previously belonged to the write portion of the primary region in one interval to belong to the read portion of the primary region in another time interval.

17. A cache system, comprising:
- a cache having a primary region that is split into a read portion and write portion and one or more sample region each split into a read portion and a write portion;
- counters for tracking hits in the primary region and hits in each of the one or more sample region during a predefined interval;
- a comparator for comparing a hit rate in the primary region to a hit rate in each of the one or more sample region; and
- a cache controller including control logic for caching reads and writes from a hard disk such that each cached read is located at the read portion of the sample region or primary region and each cached write is located at the write portion of the sample region or primary region, and for adjusting the read/write area ratio of the primary region according to the comparison performed by the comparator.

18. The cache system of claim 17, wherein the cache controller further comprises control logic for independently setting different read/write area ratios for a plurality of sample regions of the cache, comparing a hit rate in the primary region to a hit rate in each of the plurality of sample regions, and adjusting the read/write area ratio of the primary region based on the read/write area ratio of the sample region having the best hit rate.

19. The cache system of claim 17, wherein the cache controller further comprises control logic for controllably directing read and write requests to the sample region and primary region of the cache in proportion to the sizes of the sample region and primary region.

20. The cache system of claim 17, further comprising an interval counter for measuring the predefined interval using a predefined time period, a predefined number of cycles, or a predefined number of requests.

* * * * *